US010188939B2

(12) United States Patent
Zhang et al.

(10) Patent No.: US 10,188,939 B2
(45) Date of Patent: Jan. 29, 2019

(54) MODULAR CONSTRUCTION FOR INTERACTING WITH SOFTWARE

(71) Applicant: Microsoft Technology Licensing, LLC, Redmond, WA (US)

(72) Inventors: Haiyan Zhang, London (GB); Nicolas Villar, Cambridge (GB); James William Scott, Cambridge (GB); Greg Saul, London (GB); Alexandra Keeley Bunting, London (GB); Lee Jason Schuneman, London (GB); Philip Robert Harrison, Chalfont St Giles (GB); Struan Andrew Robertson, Oxford (GB); Jonathan Leslie Venables, London (GB); Thomas James Mejias Stott, London (GB); Sandeep Bhara, Hertfordshire (GB); Navtej Sunner, Rugby (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 744 days.

(21) Appl. No.: 14/204,740

(22) Filed: Mar. 11, 2014

(65) Prior Publication Data
US 2015/0258435 A1 Sep. 17, 2015

(51) Int. Cl.
*A63F 13/24* (2014.01)
*A63F 13/235* (2014.01)
(Continued)

(52) U.S. Cl.
CPC ............ *A63F 13/24* (2014.09); *A63F 13/235* (2014.09); *A63H 3/16* (2013.01); *A63H 33/042* (2013.01);
(Continued)

(58) Field of Classification Search
CPC .......... A63F 13/00; A63F 13/02; A63F 13/23; A63F 13/235; A63F 13/24
(Continued)

(56) References Cited

U.S. PATENT DOCUMENTS 4,883,440 A * 11/1989 Bolli .................... A63H 33/042
439/752
6,149,490 A 11/2000 Hampton et al.
(Continued)

FOREIGN PATENT DOCUMENTS

CN 1834906 A 9/2006
CN 103281928 A 9/2013
(Continued)

OTHER PUBLICATIONS

Gilpin, et al., "Robot Pebbles: One Centimeter Modules for Programmable Matter through Self-disassembly", In Proceedings of the 2010 IEEE International Conference on Robotics and Automation, May 3, 2010, pp. 2485-2492.
(Continued)

*Primary Examiner* — William H McCulloch, Jr.
*Assistant Examiner* — Chase Leichliter
(74) *Attorney, Agent, or Firm* — Alleman Hall Creasman & Tuttle LLP

(57) ABSTRACT

A modular assembly system is described which enables interaction with an interactive software experience such as a game. The system enables a coherent physical whole object to be assembled from a core module and one or more peripheral modules. The core module includes a battery, processor and a wireless module which is able to communicate with the interactive software experience which runs on a separate computing device such as a smartphone, tablet or games console. Each of the peripheral modules stores a module ID and these IDs are collected by the core module
(Continued)

and communicated to the interactive software experience. The user experience within the interactive software experience changes dependent upon the set of modules which are connected to form the coherent physical whole object and may also be altered as a result of manipulation of the coherent physical whole object or individual modules.

18 Claims, 10 Drawing Sheets

(51) Int. Cl.
*A63H 33/04* (2006.01)
*A63H 3/16* (2006.01)
*A63F 13/23* (2014.01)

(52) U.S. Cl.
CPC ............ *A63H 33/046* (2013.01); *A63F 13/23* (2014.09); *A63H 2200/00* (2013.01)

(58) Field of Classification Search
USPC .......................... 463/36, 44, 47; 446/97–100
See application file for complete search history.

(56) References Cited

U.S. PATENT DOCUMENTS

| | | | |
|---|---|---|---|
| 6,290,565 B1 * | 9/2001 | Galyean, III | A63H 3/16 273/148 B |
| 6,454,624 B1 | 9/2002 | Duff et al. | |
| 6,471,565 B2 * | 10/2002 | Simeray | A63H 33/00 340/10.1 |
| 6,526,375 B1 * | 2/2003 | Frankel | G06F 15/803 703/21 |
| 6,575,802 B2 | 6/2003 | Yim et al. | |
| 6,682,392 B2 | 1/2004 | Chan | |
| 6,773,322 B2 | 8/2004 | Gabai et al. | |
| 6,773,344 B1 | 8/2004 | Gabai et al. | |
| 6,954,659 B2 | 10/2005 | Tushinsky et al. | |
| 7,003,588 B1 | 2/2006 | Takeda et al. | |
| 7,154,363 B2 | 12/2006 | Hunts | |
| 7,316,567 B2 * | 1/2008 | Hsieh | A63H 33/08 434/171 |
| 7,371,177 B2 * | 5/2008 | Ellis | G06N 3/004 345/473 |
| 7,641,476 B2 | 1/2010 | Didur et al. | |
| 7,695,338 B2 | 4/2010 | Dooley et al. | |
| 8,079,846 B1 | 12/2011 | Cookson | |
| 8,087,939 B2 | 1/2012 | Rohrbach et al. | |
| 8,257,157 B2 | 9/2012 | Polchin | |
| 8,317,566 B2 | 11/2012 | Ganz | |
| 8,475,275 B2 | 7/2013 | Weston et al. | |
| 8,548,819 B2 | 10/2013 | Chan et al. | |
| 8,753,163 B2 * | 6/2014 | Gaute | A63H 33/042 446/85 |
| 8,753,164 B2 * | 6/2014 | Hansen | A63H 33/042 446/85 |
| 8,932,123 B2 * | 1/2015 | Murayama | A63H 33/042 463/15 |
| 9,555,326 B2 | 1/2017 | Scott et al. | |
| 9,597,607 B2 * | 3/2017 | Bdeir | H01R 13/6205 |
| 9,703,896 B2 | 7/2017 | Zhang et al. | |
| 2001/0049249 A1 | 12/2001 | Tachau et al. | |
| 2002/0196250 A1 * | 12/2002 | Anderson | G06T 19/00 345/420 |
| 2003/0026090 A1 | 2/2003 | Bornovski | |
| 2004/0110557 A1 | 6/2004 | Rowe | |
| 2004/0215958 A1 | 10/2004 | Ellis et al. | |
| 2005/0059483 A1 * | 3/2005 | Borge | A63F 13/02 463/29 |
| 2005/0132290 A1 | 6/2005 | Buchner et al. | |
| 2007/0072680 A1 | 3/2007 | Ikeda | |
| 2007/0097832 A1 | 5/2007 | Koivisto et al. | |
| 2007/0184722 A1 * | 8/2007 | Doherty | A63H 33/042 439/638 |
| 2007/0191100 A1 | 8/2007 | Counts | |
| 2007/0198117 A1 | 8/2007 | Wajihuddin | |
| 2007/0211047 A1 * | 9/2007 | Doan | A63F 1/04 345/419 |
| 2008/0009348 A1 | 1/2008 | Zalewski et al. | |
| 2008/0294763 A1 | 11/2008 | Uchida | |
| 2009/0029771 A1 * | 1/2009 | Donahue | A63F 13/10 463/31 |
| 2009/0081923 A1 | 3/2009 | Dooley et al. | |
| 2009/0197658 A1 * | 8/2009 | Polchin | A63F 13/02 463/9 |
| 2009/0291764 A1 | 11/2009 | Kirkman et al. | |
| 2009/0307592 A1 | 12/2009 | Kalanithi et al. | |
| 2010/0007528 A1 | 1/2010 | Urata et al. | |
| 2010/0026458 A1 | 2/2010 | Samdahl et al. | |
| 2010/0052916 A1 | 3/2010 | Canora et al. | |
| 2010/0144429 A1 | 6/2010 | Ryan et al. | |
| 2010/0167623 A1 | 7/2010 | Eyzaguirre et al. | |
| 2011/0021109 A1 | 1/2011 | Le et al. | |
| 2012/0050198 A1 | 3/2012 | Cannon | |
| 2012/0122059 A1 | 5/2012 | Schweikardt et al. | |
| 2012/0286629 A1 | 11/2012 | Johnson et al. | |
| 2013/0109267 A1 | 5/2013 | Schweikardt et al. | |
| 2013/0109272 A1 | 5/2013 | Rindlisbacher | |
| 2013/0122753 A1 | 5/2013 | Blakborn | |
| 2013/0165223 A1 | 6/2013 | Leyland et al. | |
| 2013/0173658 A1 | 7/2013 | Adelman et al. | |
| 2013/0196770 A1 | 8/2013 | Barney et al. | |
| 2013/0288563 A1 | 10/2013 | Zheng et al. | |
| 2014/0030955 A1 * | 1/2014 | Smetanin | A63H 3/36 446/268 |
| 2014/0244018 A1 | 8/2014 | Bach et al. | |
| 2015/0004871 A1 | 1/2015 | Laursen | |
| 2015/0104774 A1 * | 4/2015 | Watry | G09B 5/00 434/276 |
| 2015/0127146 A1 * | 5/2015 | Carlson | B25J 9/1617 700/245 |
| 2015/0258434 A1 | 9/2015 | Scott et al. | |
| 2017/0308624 A1 | 10/2017 | Zhang et al. | |

FOREIGN PATENT DOCUMENTS

| | | |
|---|---|---|
| EP | 1271415 A1 | 1/2003 |
| EP | 1291138 A2 | 3/2003 |
| EP | 1883194 A1 | 1/2008 |
| EP | 2311539 A2 | 4/2011 |
| WO | 2001012285 A1 | 2/2001 |
| WO | 2001069799 A2 | 9/2001 |
| WO | 2001069829 A2 | 9/2001 |
| WO | 2005083546 A1 | 9/2005 |
| WO | 2009037679 A1 | 3/2009 |
| WO | 2012160055 A1 | 11/2012 |

OTHER PUBLICATIONS

Gorbet, et al., "Triangles: Tangible Interface for Manipulation and Exploration of Digital Information Topography", In Proceedings of the SIGCHI Conference on Human Factors in Computing Systems, Jan. 1, 1998, pp. 49-56.

"International Search Report & Written Opinion Issued in PCT Application No. PCT/US2015/018562", dated Sep. 2, 2015, 12 Pages.

"International Preliminary Report on Patentability Issued in PCT Application No. PCT/US2015/018562", dated Jun. 13, 2016, 6 pages.

Schweikardt, Eric, "Designing Modular Robots", Nov. 19, 2013, Available at: http://www.cmu.edu/architecture/research/grad_work/2009_phdcd_schweikardt_eric.pdf.

"Skylanders Swapforce", Sep. 11, 2013, Available at: http://www.skylanders.com/swapforce.

"Disney Infinity", Nov. 19, 2013, Available at: https://infinity.disney.com/en-gb.

"Cubelets", Sep. 11, 2013, Available at: http://www.modrobotics.com/.

"Shapeways", Nov. 19, 2013, Available at: http://shapeways.com/.

(56) References Cited

OTHER PUBLICATIONS

Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.
Kikin-Gil, Ruth, "BuddyBeads", Published on: Oct. 10, 2006, Available at: http://www.ruthkikin.com/Images/r.kikin-gil_thesis2005.pdf.
Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.
Labrune, et al., "Telebeads: Social Network Mnemonics for Teenagers", In Proceedings of Conference on Interaction Design and Children, Jun. 7, 2006, 8 pages.
Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=xls2X1pGZIe-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.
Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.
Lampe, et al., "Integrating Interactive Learning Experiences into Augmented Toy Environments", In Proceedings of the Pervasive Learning Workshop at the Pervasive Conference, May 2007, 8 pages.
"Seebo Platform", Published on: Jun. 22, 2013, Available at: http://www.seebo.com/.
Raffle, et al., "Topobo: A Constructive Assembly System with Kinetic Memory", In Proceedings of the SIGCHI Conference on Human Factors in Computing Systems, Apr. 24, 2004.
Schmid, et al., "Networking Smart Toys with Wireless ToyBridge and ToyTalk", In IEEE International Conference on Computer Communications, Apr. 10, 2011, 2 pages.
Patrizia, et al., "A Robotic Toy for Children with special needs: From requirements to Design", In IEEE 11th International Conference on Rehabilitation Robotics, Nov. 20, 2013, 6 pages.
Zaino, Jennifer, "JNFC Technology Brings New Life to Games", In Journal of RFID, Oct. 1, 2012, 10 pages.
"The NEX band", Jan. 3, 2014, Available at: http://www.mightycast.com.
PCT Search Report and Written Opinion dated Mar. 22, 2016 for PCT Application No. PCT/US15/018562, 5 Pages.
"Final Office Action Issued in U.S. Appl. No. 14/203,991", dated Mar. 4, 2016, 5 Pages.
"Non Final Office Action Issued in U.S. Appl. No. 14/203,991", dated Aug. 16, 2016, 6 Pages.
"Non Final Office Action Issued in U.S. Appl. No. 14/203,991", dated Sep. 29, 2015, 11 Pages.
"Notice of Allowance Issued in U.S. Appl. No. 14/203,991", dated Mar. 6, 2017, 7 Pages.
"Non-Final Office Action Issued in U.S. Appl. No. 14/204,239", dated Mar. 21, 2016, 10 Pages.
"Notice of Allowance Issued in U.S. Appl. No. 14/204,239", dated Sep. 12, 2016, 8 Pages.
"Final Office Actsion Issued in U.S. Appl. No. 14/204,483", dated Nov. 30, 2017, 19 Pages.
"Final Office Action Issued in U.S. Appl. No. 14/204,483", dated Sep. 13, 2016, 17 Pages.
"Non Final Office Action Issued in U.S. Appl. No. 14/204,483", dated Apr. 15, 2016, 22 Pages.
"Second Written Opinion Issued in PCT Application No. PCT/US2015/019341", dated Jan. 26, 2016, 6 Pages.
"Non Final Office Action Issued in U.S. Appl. No. 14/204,483", dated Jun. 2, 2017, 18 Pages.
"Non-Final Office Action Issued in U.S. Appl. No. 14/205,077", dated Oct. 29, 2015, 11 Pages.
"Notice of Allowance Issued in U.S. Appl. No. 14/205,077", dated Jun. 28, 2016, 7 Pages.
"Notice of Allowance Issued in U.S. Appl. No. 14/205,077", dated Oct. 31, 2016, 7 Pages.
"Notice of Allowance Issued in U.S. Appl. No. 14/204,483", dated Apr. 2, 2018, 7 Pages.
"Office Action Issued in U.S. Appl. No. 15/453,375", dated Nov. 8, 2017, 9 Pages.
"Office Action Issued in European Patent Application No. 15716200.9", dated Jan. 3, 2018, 4 Pages.
"Supplementary Search Report Issued in European Patent Application No. 15762353.9", dated Oct. 6, 2017, 7 Pages.
"Office Action Issued in Chinese Patent Application No. 201580013171.0", dated Apr. 4, 2014, 7 Pages.
Ahde, et al., "Hello—Bracelets Communicating Nearby Presence of Friends", In Proceedings of the Tenth Anniversary Conference on Participatory Design, Sep. 30, 2008, 3 Pages.
"International Search Report and Written Opinion Issued in PCT Application No. PCT/US2015/019341", dated Jun. 15, 2015, 11 Pages.
"International Search Report and Written Opinion Issued in PCT Application No. PCT/US2015/018560", dated May 20, 2015, 11 Pages.
"International Preliminary Report on Patentability Issued in PCT Application No. PCT/US2015/018561", dated Mar. 10, 2016, 8 Pages.
"International Search Report and Written Opinion Issued in PCT Application No. PCT/US2015/018561", dated May 20, 2015, 11 Pages.
"Second Written Opinion Issued in PCT Application No. PCT/US2015/018561", dated Dec. 14, 2015, 6 Pages.
"International Preliminary Report on Patentability Issued in PCT Application No. PCT/US2015/019341", dated Apr. 26, 2016, 07 Pages.
"Non Final Office Action Issued in U.S. Appl. No. 15/646,004", dated Jun. 22, 2018, 12 Pages.
"Office Action Issued in European Patent Application No. 15718279", dated Jun. 13, 2018, 5 Pages.
"Office Action Issued in Chinese Patent Application No. 201580013135.4", dated Sep. 30, 2018, 9 Pages.
"Office Action Issued in Chinese Patent Application No. 201580013167.4", dated Aug. 28, 2018, 20 Pages.

* cited by examiner

US 10,188,939 B2

MODULAR CONSTRUCTION FOR INTERACTING WITH SOFTWARE

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known apparatus for interacting with interactive software experiences, such as games.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A modular assembly system is described which enables interaction with an interactive software experience such as a game. The system enables a coherent physical whole object to be assembled from a core module and one or more peripheral modules. The core module includes a battery, processor and a wireless module which is able to communicate with the interactive software experience which runs on a separate computing device such as a smartphone, tablet or games console. Each of the peripheral modules stores a module ID and these IDs are collected by the core module and communicated to the interactive software experience. The user experience within the interactive software experience changes dependent upon the set of modules which are connected to form the coherent physical whole object and may also be altered as a result of manipulation of the coherent physical whole object or individual modules.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
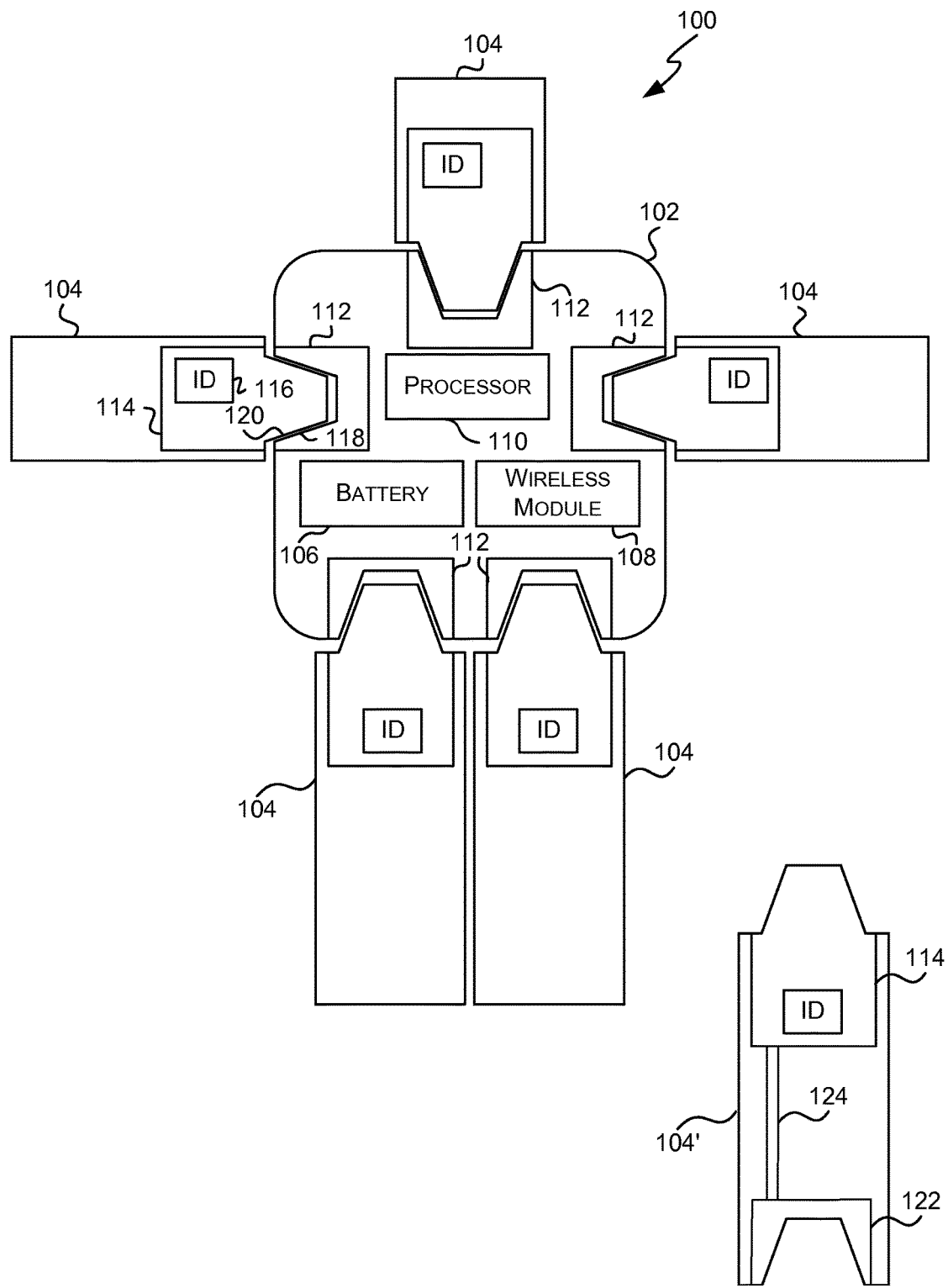
FIG. 1 is a schematic diagram of a coherent physical whole object formed from a core module and a plurality of peripheral modules.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A system is described below which comprises a plurality of hardware modules which are each a sub-component of a coherent physical whole object, such as a toy. The modules may be connected together and re-arranged by users as part of interaction with an interactive software experience (e.g. a game) and in some examples, the act of assembly of a plurality of modules by a user into a complete object unlocks or enables the interactive software experience or parts thereof (e.g. particular features, mini-games, levels, etc.). User interaction with the coherent physical whole object (or modules that form part of the object), e.g. user manipulation of the object, may also affect the operation of the interactive software experience. The coherent physical whole object therefore acts as a user input device for the interactive software experience.

Once assembled, the coherent physical whole object is physically attached together to form a single object, i.e. requiring a deliberate action by the user to detach (e.g. an applied force to overcome a mechanical friction fit or a magnetic attachment holding the modules together, or an unclasping or threading action so that a module can be removed or disconnected from an adjacent module). This is in contrast to systems in which a module or modules are sensed to be near or touching one another, but no mechanical element holds them together (with the exception of gravity, if the whole assembly is only lifted vertically from underneath). The coherent physical whole object is connected wirelessly to the interactive software experience and is not connected by a wire or other physical linking. The coherent physical whole object 108 is moveable freely (e.g. in three dimensions) by a user and is capable of communicating with the interactive software experience while it is in motion. The coherent physical whole object 108 (and/or the modules from which it is formed) may comprise mechanical articulation or movement affordances, e.g. it may have joints such as hinges, or some elements may be mobile compared to other elements, e.g. sliding or rotating with respect to one another.

Each coherent physical whole object comprises at least one core module and one or more peripheral modules. A core module comprises additional processing capability compared to a peripheral module (further differences are described below) and generally a core module acts as a master while the peripheral modules act as slave modules; however a core module may in various examples be configured to act as a slave (e.g. where there is more than one core module).

The modules can, for example, represent parts (e.g. head, body, limbs) of a humanoid/animal/mystical character (e.g. a human, animal or robot), vehicles or parts thereof (e.g. chassis, wheels, roof, etc.), accessories for a vehicle or character (e.g. weapons, clothing, armor, or other objects which the character may wear/carry/hold), tracks (e.g. for a car, train, human, animal or other mobile object), bricks (e.g. as part of a construction set), baseboards or levels (e.g. where the tracks/bricks/baseboards/levels may form part of a playset such as a train set, model village, tower block, dolls house or other construction), parts of an educational toy (e.g. parts of a molecular model, skeleton or body, etc.) or fashion items or parts thereof. Where the interactive software experience is a game, the modules may comprise sub-components of a game piece (which may also be referred to as a toy or modular toy) and that game piece may be a character, vehicle, etc.

FIG. 1 is a schematic diagram of a coherent physical whole object 100 formed from a core module 102 and a plurality of peripheral modules 104. As described above, in various examples an object may comprise more than one core module 102 and/or may only comprise a single peripheral module 104. In various examples, an object may comprise three or more modules (e.g. a core module 102 and two other modules which may be core or peripheral modules). The core module 102 comprises a battery 106, a wireless communications module 108, a processor 110 and one or more connectors 112. The battery 106 provides power to components within the core (such as processor 110 and wireless communications module 108) and also to some/all of the peripheral modules 104 via the connectors 112. The wireless communications module 108 enables the core module 102 to communicate with a computing device running an interactive software experience, such as a game, virtual world, website, social media application, personal organization application (e.g. to set out a family/work schedule through physical tokens representing tasks), multimedia application (e.g. to compose photos and music represented by physical tokens into a slideshow/movie for sharing), and so on. Any suitable wireless technology may be used (e.g. Bluetooth®, Bluetooth® Low Energy, WiFi™ or WiFi™ Direct, Near Field Communication (NFC), 802.15.4, etc.). The wireless communications module 108 may communicate directly with the computing device running the interactive software experience (e.g. smartphone, tablet computer, games console, etc.) or may communicate via a network (e.g. a home network or the internet) or intermediary device (e.g. a wireless access point). The connectors 112 physically attach the peripheral modules 104 to the core 102 and also pass data and power between modules.

The processor 110 within the core module 102 is arranged to collect the IDs (which may be a unique ID or an ID shared with other identical-looking modules, e.g. an ID for a type of module) of each of the modules connected to form the coherent physical whole 100. The processor 110 may be a microprocessor, controller or any other suitable type of processor for processing computer executable instructions to control the operation of the core module in order to collect the IDs of connected modules. In the examples shown in FIG. 1, the connected modules (i.e. the modules other than the core which are connected to form the coherent physical whole object 100) are all peripheral modules 104; however, where the whole comprises more than one core, the connected modules may comprise both peripheral and core modules. The module IDs are collected from each of the connected modules directly (e.g. via a bus), rather than each module collecting information on its neighbors with the core just aggregating the data provided by its direct neighbor modules. In various examples, these module IDs may be collected via the data connection provided by the connectors 112 and in other examples, another means may be used (e.g. NFC, QR codes or computer vision). Where other means are used, the core module 102 may comprise additional hardware/software such as an NFC reader module or a camera or other image sensor to collect the module IDs of all the connected modules. In various examples, in addition to simply collecting the module IDs of the connected modules (e.g. to generate a set or list of connected modules), the core may detect the topology of the modules (i.e. the arrangement of modules) within the coherent physical whole object 100.

Each peripheral module 104 comprises one or more connectors 114 to physically attach the module to another module to form the coherent physical whole. Although FIG. 1 shows a star configuration, with each peripheral module 104 connecting directly to the core module 102, in other examples different configurations (or topologies) may be used (e.g. a tree, mesh, graph or bus topology) and peripheral modules 104 may connect to other peripheral modules 104 (and this may be referred to as 'chaining' of modules). An example peripheral module 104' is shown in FIG. 1 which enables chaining. As shown in FIG. 1, the peripheral module 104' comprises two connectors 114, 122. The peripheral module 104' further comprises electrical connections 124 (e.g. in the form of a bus comprising 2 wires, data and ground) between the two connectors 114, 122.

Each peripheral module 104 also comprises a storage element 116 which stores an identifier (ID) for the peripheral module (which may be referred to as the module ID). The storage element 116 may comprise memory or any other form of storage device. In the example shown in FIG. 1, the storage element 116 which stores the module ID is actually within the housing of the connector 114; however, in other examples it may be separate from the connector. In various examples, a peripheral module 104 may also comprise a processor (not shown in FIG. 1) and this too may be within the housing of the connector 114 or separate from the connector. In various examples, a peripheral module 104 may also comprise a battery (not shown in FIG. 1) and this may provide power to electronics within the peripheral module 104 and/or to neighboring modules (which may be peripheral or core modules). In this way, if a coherent physical whole object 100 requires more power than can be provided by the battery 106 in the core module 102, additional power can be provided by a battery in a peripheral module 104.

Although not shown in FIG. 1, a core module 102 may also comprise a storage element which stores an identifier for the module. As with the peripheral module, the storage element may comprise memory or any other form of storage device. The storage element which stores the module ID may be within a connector 112, the wireless module 108 or may be a separate entity within the core module 102.

It will be appreciated that the modules 102, 104, 104' shown in FIG. 1 may comprise additional elements not shown in FIG. 1 and various examples are described herein. It will further be appreciated that although FIG. 1 shows the core module 102 as a robot body and the peripheral modules 104, 104' as the head and limbs, each of the modules can have any physical form factor (e.g. any shape of external housing) which is compatible with the other modules (i.e. each module is shaped such that it can connect to at least one other module, without the outer housing clashing).

In various examples, a module (which may be a peripheral module 104 or a core module 102) may comprise one or more sensors, actuators and/or displays that are controlled by and/or provide data to the processor 110 within the core module 102. Examples of sensors that may be used include: temperature sensors, vibration sensors, accelerometers, tilt sensors, gyroscopic sensors, rotation sensors, magnetometers, proximity sensors (active/passive infrared or ultrasonic), sound sensors, light sensors, etc. Examples of actuators that may be used include: motors, servos, vibration units, solenoids, speakers, etc. Examples of displays that may be used include one or more LEDs, a small LCD display, an e-ink display, etc. Where a module comprises a sensor, the sensor data may be communicated by the core module 102 to the interactive software experience.

Figure 2:
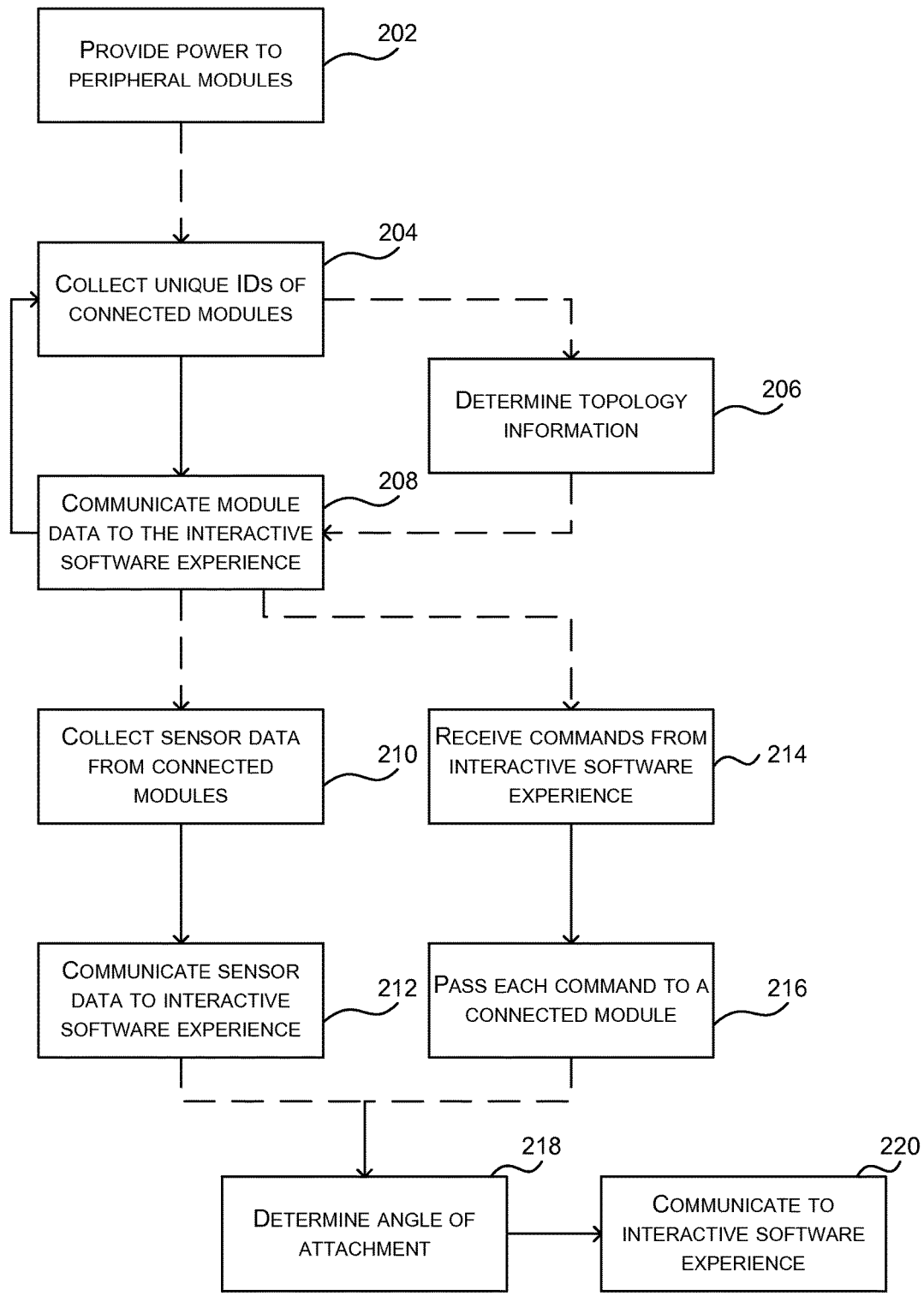
FIG. 2 is a flow diagram of an example method of operation of a core module, such as shown in FIG. 1.

FIG. 2 is a flow diagram of an example method of operation of a core module 102, such as shown in FIG. 1. As described above, the core module 102 collects the IDs of the connected modules (block 204) and communicates module data to the interactive software experience (block 206) via the wireless module 108. As described above, in some examples the core module 102 may collect a list of IDs (which may or may not include its own ID) and in other examples, the core module 102 may additionally determine topology information about the coherent physical whole 100 (block 206). The topology determination (in block 206) may be performed at the same time as collecting the IDs (in block 204) or may be performed separately.

Figure 3:
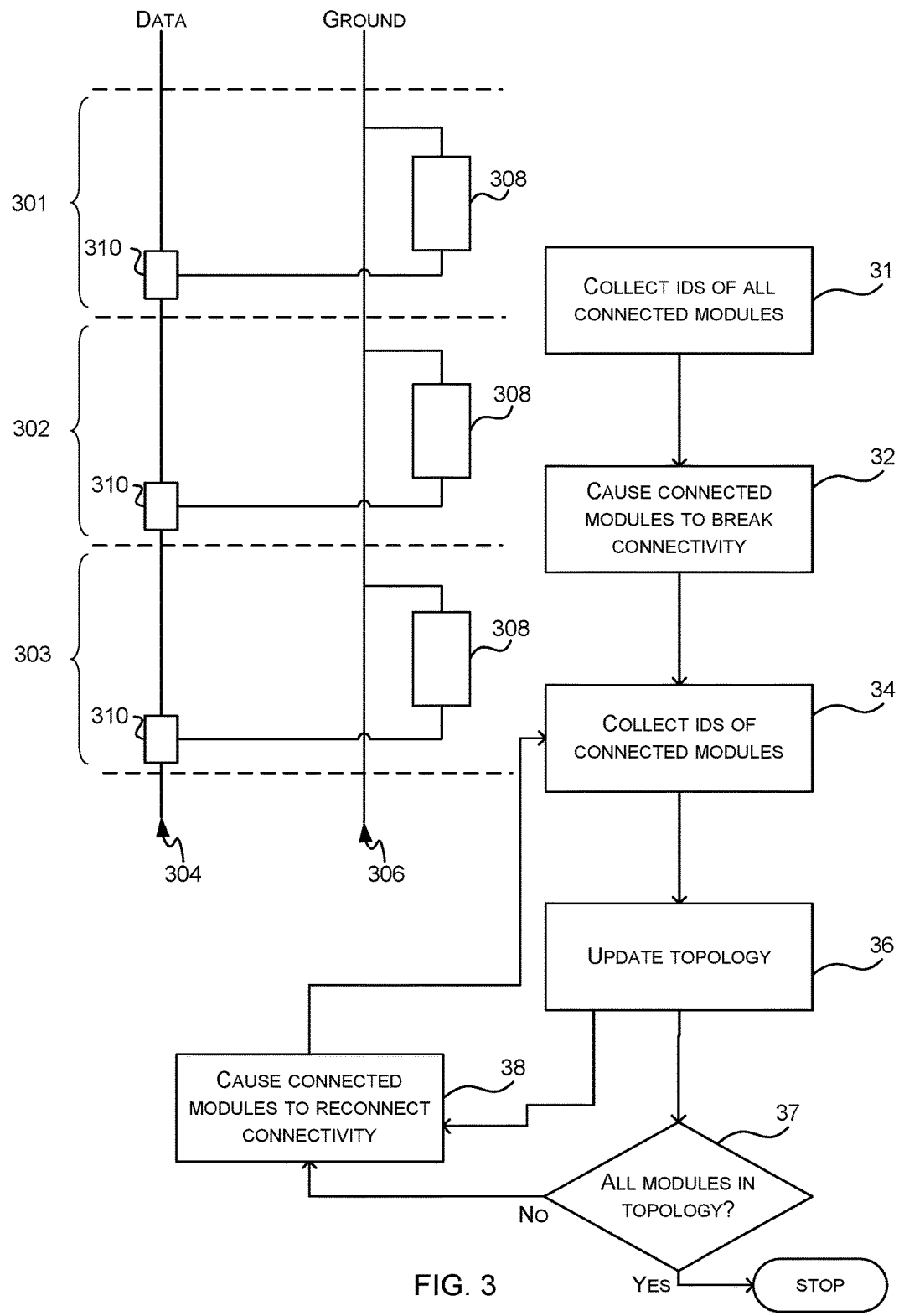
FIG. 3 shows a schematic diagram of the electrical connections between three modules and a flow diagram of an example method of topology detection.

The topology determination (in block 206) may use any suitable method. In various examples, each connector 112, 114 in a module 102, 104 may comprise hardware logic (such as an electronic switch) to enable the processor 110 within the core module 102 to dissect the bus (i.e. the electrical connections connecting all the modules) programmatically. This can be described with reference to FIG. 3. FIG. 3 shows three modules 301-303, which may all be peripheral modules, connected to a 2-wire bus comprising a data line 304 and ground 306. Hardware logic 308 (which includes the storage device holding the module ID and may comprise a processor or other logic elements) within each module (e.g. within each connector 112, 114, 122 in a module) connects between the two lines 304, 306 and a protocol such as the 1-Wire™ system may be used by the core module to communicate with each of the modules 301-303. In order that the core module can dissect the bus programmatically, each connector comprises hardware logic 310 which can be controlled by the core module and used to dissect the bus (e.g. by breaking the connectivity of the data line 304).

In the example shown in FIG. 3, the core module may first cause the hardware logic 310 in all modules to break the connectivity of modules (block 32). This may alternatively be described as dissecting the bus and may be achieved in the example of FIG. 3 by opening the switch 310 to break the connectivity in the data line 304. The core module may then collect the IDs of all connected modules (block 34), which in this case would only identify the ID of the first module 301 as the other modules are not currently electrically connected to the core module and this may be used to update topology information about the coherent physical whole object (block 36). The core module may then cause the hardware logic 310 within the identified first module 301 to reconnect the bus (block 38 e.g. by closing its switch) and the core module may then repeat the ID collection operation (in block 34). This second iteration would identify two IDs—the IDs of the first two modules 301, 302, such that the core module now knows that the second module 302 is connected to the first module 301 (and the topology is updated accordingly in block 36). This method may then be repeated to explore the full topology.

In order that the core module knows when it has identified the relative position of all the connected modules, the core may first (prior to causing the bus to be dissected) detect the IDs of all the connected modules (block 31, e.g. when the bus is fully connected) and then proceed with the iterative discovery process until all detected IDs have been discovered. An example method of operation of the core module which uses this is described below.

In a first detection step (block 31) the core module detects all the connected modules, which in the example of FIG. 3 comprises three modules 301-303. It may then cause the bus to be dissected by each of the modules (block 32). In a second detection step (block 34), the core module will now only detect the first module 301 so can generate the start of the topology as "core-module 301" (block 36). The core module may then check whether all modules have been included within the topology (block 37) and in this case modules 302 and 303 are missing ('No' in block 37). The core module may then instruct detected module 301 to reconnect the bus. In fact, the core can instruct all connected modules to reconnect the bus (block 38). In a third detection step (block 34) the core module will now detect two modules 301, 302 and so can extend the topology to "core-module 301-module 302" (block 36). The core module may then check whether all modules have been included within the topology and in this case module 303 is missing ('No' in block 37). The core module may then instruct detected module 302 (or all connected modules) to re-connect the bus (block 38) before performing a fourth detection step. In this fourth detection step (block 34) the core module will detect all three modules 301-303 and so can extend the topology further to "core-module 301-module 302-module 303" (block 36). The core module may then check whether all modules have been included within the topology and in this case all modules have been included ('Yes' in block 37) and so the detection can stop (block 39).

Referring back to FIG. 2, the module data which is communicated to the interactive software experience (in block 208) comprises the module IDs (from block 204, or block 31 or 34 of FIG. 3 and which may also include the module ID of the core module 102) and may also comprise topology information (from block 206 or block 36 of FIG. 3). In other examples, the module data may be an aggregated form of the module IDs, rather than the raw IDs themselves. For example, where the processor 110 within the core module is aware of the identity of sets (or groups) of modules, the module data may comprise identities of sets (e.g. "Group 2") in addition to or instead of identities of individual modules (e.g. "module A, module B, . . . "). As described above, the data which is communicated to the interactive software experience may result in a change in the operation of the interactive software experience (e.g. through enabling, disabling or modifying functionality and by displaying a visual representation of the object in a graphical user interface of the interactive software experience).

Some or all of the methods shown in FIGS. 2 and 3 may be repeated periodically. For example, a core module may regularly perform a collection of all module IDs (e.g. as in blocks 204 and 31) in order to determine if a user has re-arranged the modules within the object 100 (e.g. by removing/adding/replacing a module). In other examples, detection of re-arrangement may be performed in another way (e.g. a peripheral module may signal to the core when it has been attached, or the core module might explicitly poll for modules by their ID or a subset thereof, to either sense disconnection or connection).

When a user re-arranges the modules (e.g. by removing or adding a new module), it may not be necessary to perform a full topology analysis (e.g. as shown in FIG. 3) as the core module may know that a module that has been removed and may first check whether the new module has been added in place of the removed module. This may, for example, involve performing only selective dissection of the bus. In other examples, the full topology analysis may be performed. In other examples, the physical limitations of the connection/disconnection mechanism may provide data as to the physical topology which can be combined with the data from the virtual topology. For example, a wristband in which modules are added by threading them onto the end may use "bus" wiring system, in which it may be hard to detect the order of modules on the band through communication alone, but using the knowledge of the threading mechanism means that if objects A then B then C are detected, then object A must be furthest along the band, B must be in the middle, and C must be closest to the end of the band where threading occurs. Or, other physical attributes of the modules (e.g. their physical size or the nature of the mechanical attachment points) may be used to infer details about the physical arrangement, e.g. through knowing that only an arm can be physically attached to a body, and only a weapon may be attached to an arm.

In addition to collecting the module IDs and communicating them to the interactive software experience (in blocks 204-208), the core module may additionally perform one or more additional functions. As shown in FIG. 2, the core module may provide power to a peripheral module (block 202). This power may be provided via the connector 112 and may use an electrical contact within the connector or alternatively may use inductive (non-contact) charging methods with the connector 112 (and corresponding connector 114 in the peripheral module) comprising an inductive coil.

Where a peripheral module 104 or the core module 102 comprises one or more sensors, the core module 102 collects the sensor data (block 210) and communicates this data to the interactive software experience (block 212). As described above with reference to the IDs, the data which is communicated to the interactive software experience (e.g. via wireless module 108) may be the raw sensor data or an aggregated or processed form of the sensor data.

In various examples, the core module 102 may receive commands from the interactive software experience (block 214), for example where a module (core/peripheral) comprises an actuator or display. In response to receiving such a command, it may be processed within the core module (e.g. where the core module comprises an actuator/display) or may be passed to a connected module (block 216), e.g. to a module identified by its ID within the received command.

In various examples, such as the example shown in FIG. 3, each connector 112, 114, 122 comprises two electrical paths (e.g. ground and data). In other examples, the connectors 112, 114, 122 may provide more than two electrical paths.

Figure 4:
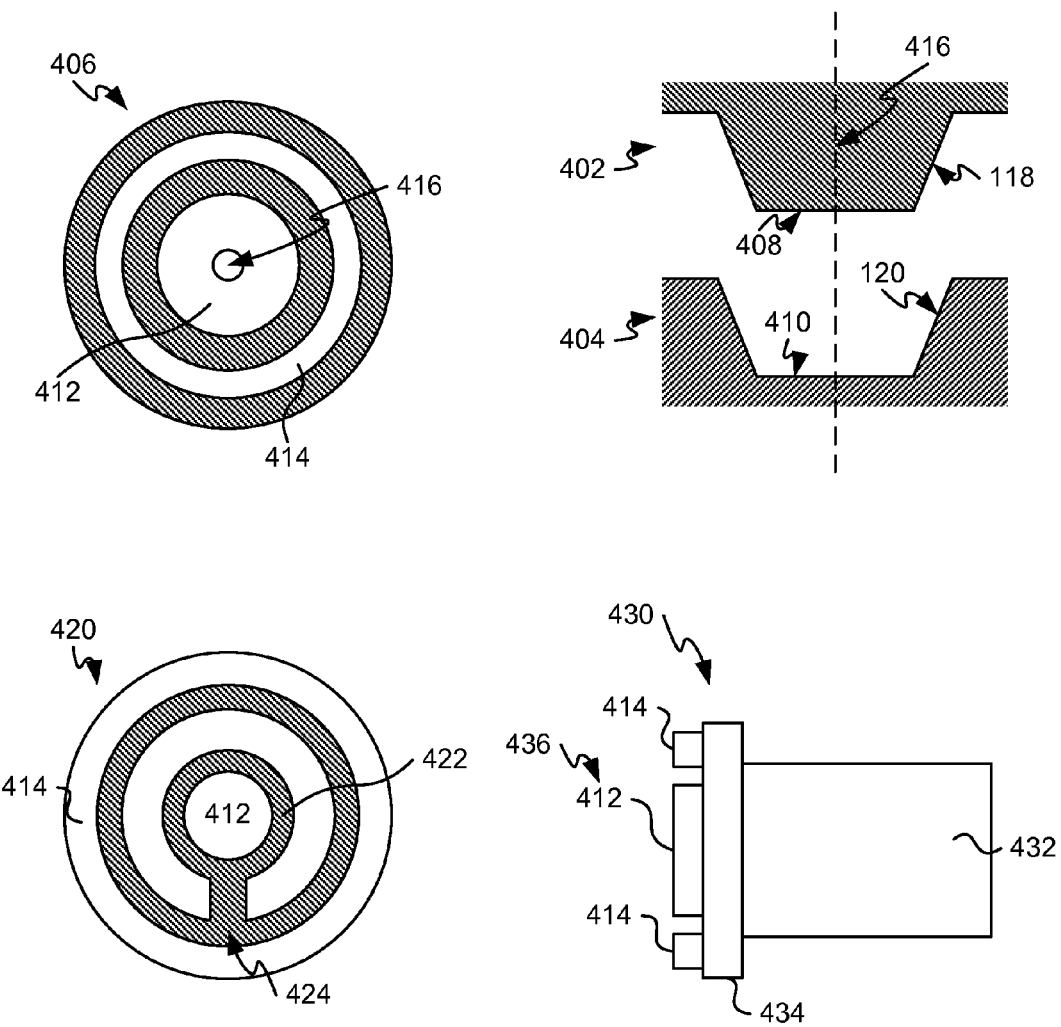
FIG. 4 shows a cross-section through each of a mating pair of connectors.

FIG. 1 shows a particular mechanical arrangement for the connectors 112, 114, 122 and this is just one example of a suitable mechanical arrangement. In this example, and many others, there are two types of connectors within a connector pair—in the example in FIG. 1 the first type of connector 112, 122 features a recess and the second type of connect 114 features a corresponding protrusion. In the arrangement shown in FIG. 1, each connector (i.e. both halves of the connector in the connector pair) comprises mechanical guiding elements 118, 120 to assist the user in correctly positioning the connectors and the modules; in other examples only one half may comprise mechanical guiding elements. FIG. 4 shows schematic diagrams of a further example connector.

FIG. 4 shows a cross-section through each of a mating pair of connectors 402, 404. A plan view 406 of the contact faces 408, 410 of each of the connectors is also shown and this view is the same for both connectors in the mating pair. It can be seen that the contact face of these connectors are circular and the connectors provide mechanical guiding elements 118, 120 as described above. The plan view 406 of the contact faces shows concentric rings of connections and in this example, two separate electrical connections 412, 414 are provided. In other examples there may be only one electrical connection or there may be more than two concentric rings. By using this arrangement, the connectors (and hence the modules) are free to rotate about the central axis 416 of the connectors, although any motion perpendicular to the axis 416 is constrained/prevented by the mechanical guiding elements 118, 120. In various examples, a connector is fixed relative to the module in which it is located, but is free to rotate with respect to another module.

In various examples, the central core (connection 412) may be free to move independently of the outer ring (connection 414). This may be achieved, for example, by forming the central core on a tab or tongue 422 which is only connected to the outer portion in one place 424, thereby forming an articulated arrangement, as shown in the second plan view 420 in FIG. 4.

In order to physically connect the modules together, such that they do not separate when pushed gently or picked up, the connections 412, 414 may be formed from magnetic material, with each of the connectors 402, 404 being of opposite polarity so that the connections in different connectors are attracted to each other and the modules are held together by the magnetic attraction. By appropriate selection of magnets and dimensions, the attractive forces may be sufficient to hold the modules together when picked up by a user, but not so strong that they cannot be separated by the user when they wish to re-arrange the modules. Different strengths of magnets may be used for different applications (e.g. less strong attraction for toys for young children).

In an alternative configuration of magnetic connector, instead of using magnetic material to form the electrical connections, a magnet 432 may be provided behind a PCB 434 (which may be a flexible PCB) providing the contact face 436 (and contacts 412, 414), as shown in the third cross section 430 in FIG. 4. The same construction may be used in both connectors 402, 404 with opposite polarity magnets 432.

Where magnets are used in the connectors to physically hold them together, the magnets (e.g. magnet 432 or the magnets providing connections 412, 414 in the alternative implementation) may be permanent magnets or may be electromagnets. Where electromagnets are used, the magnets may be programmable such that their polarity may be altered under the control of the processor 110 within the core module (and/or any processors within the peripheral modules, where provided). Use of programmable electromagnets enables a processor (e.g. processor 110 within the core module) to control whether a particular module can connect to another module or not. For example, although a module may initially be able to connect (as the electromagnets have opposite polarities) the processor 110 may subsequently change the polarity of one or more of the magnets so that they no longer attract but instead repel each other, forcibly ejecting the module. This may, for example, be used as part of the interactive software experience (e.g. within game play, for example during a battle) and/or to restrict the interoperability of modules. Examples of limiting interoperability include, but are not limited to, limiting which modules can connect to which connections on a core module (e.g. only "head modules" may be allowed to connect to the "head connection" on the core, and where a non-head module is detected, e.g. in block 204 of FIG. 2, it may be ejected by the processor) and limiting modules to work within particular sets of modules (e.g. robot limbs can only be connected to a robot body and not to, for example, a horse body, or modules associated with a particular game or brand can only be connected to other modules from the same game/brand).

The interoperability of modules may also be restricted using magnetic polarity in examples where permanent magnets are used. For example, a "head" connector on a core module may have a central connector 412 of a first polarity and an outer connector 414 of a second polarity, where the first and second polarities may be the same or different. In contrast, a "limb" connector on a core module may have a central connector 412 of the second polarity and an outer connector 414 of the first polarity. This therefore restricts limb peripheral modules to connecting only to the limb connector on the core module and head peripheral modules to connecting only to the head connector on the core module.

Although FIG. 4 shows arrangements of magnets of either a single polarity on the contact face (magnet 432) or two concentric rings of magnetic material, it will be appreciated that these are provided by way of example and other arrangements may also be used (e.g. more than two concentric rings, or shapes other than rings, where the modules do not need to rotate once connected).

The polarity of magnets may also be exploited for purposes other than (or in addition to) rejecting/ejecting modules. In various examples, the polarity of magnets within the connectors may be used to limit the angle of movement (or angle of attachment) of a module relative to another module, as shown in the example in FIG. 5. In other examples, the angle of movement/attachment may be limited using physical structures on the connector surfaces.

Figure 5:
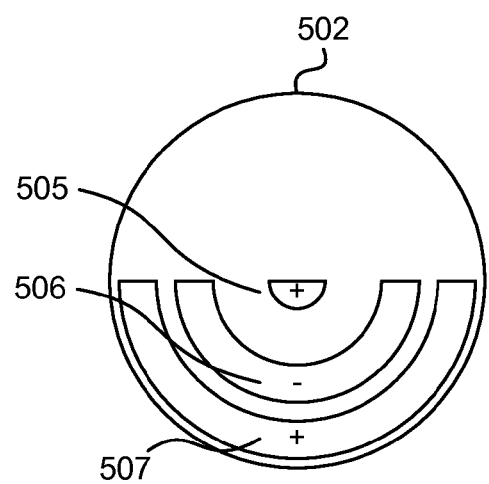
FIG. 5 shows a plan view of the contact faces on a pair of example connectors.
Figure 5:
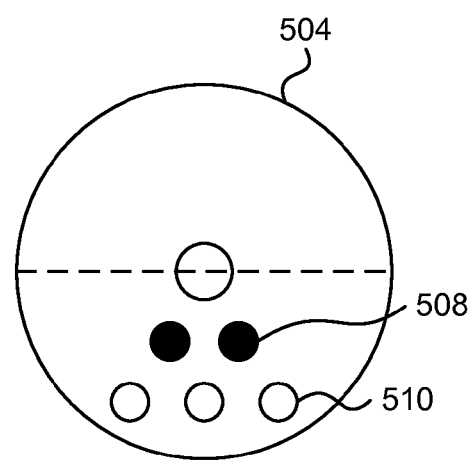

FIG. 5 shows a plan view of the contact faces 502, 504 on a pair of connectors. The first contact face 502 may be part of a connector on a core module and the second contact face 504 may be part of a connector on a peripheral module. As can be seen from FIG. 5, instead of using concentric rings of magnetic material (as shown in FIG. 4), in this example, only half-rings/circles 505-507 are used in the first contact face 502, with a central semicircle 505 of one polarity (denoted +), a middle half-ring 506 of the opposite polarity (denoted −) and an outer half-ring 507 of the first polarity (denoted +). In other examples, a single polarity may be used for all the half-rings/circles 505-507. In the opposing connector (i.e. the other half of the connector pair), the contact face 504 comprises small areas of magnetic material (circles in this example) which are arranged to cover only a small sector of the circular face (where the central angle of the sector is less than) 180°. Where the first face 502 comprises portions of different polarities, the areas in the second face 504 are also of different polarities, with one polarity (+) shown as filled areas 508 and the other (−) as non-filled areas 510. By using such an arrangement, the two modules will only stay connected whilst the areas 508, 510 from the second face are aligned with part of the rings 506-507 on the first face. If the connectors are rotated beyond this point, there will be no magnetic attraction and the modules will become detached from each other.

Referring back to FIG. 2, in various examples, the core module 102 may not only determine which modules are connected but also the angle of attachment of one or more of those connected modules (block 218) e.g. the angle of attachment of a limb. Where this is determined, this may be communicated to the interactive software experience (block 220), e.g. so that the orientation of the modules may be more accurately portrayed in the graphical user interface (GUI) of the software experience.

Figure 6:
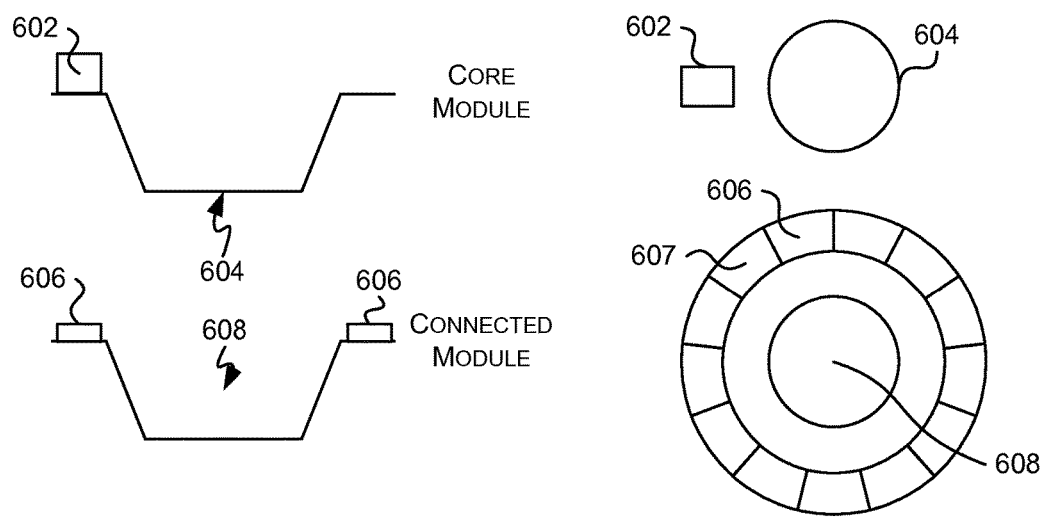
FIG. 6 shows schematic diagram of further examples of connector pairs.
Figure 6:
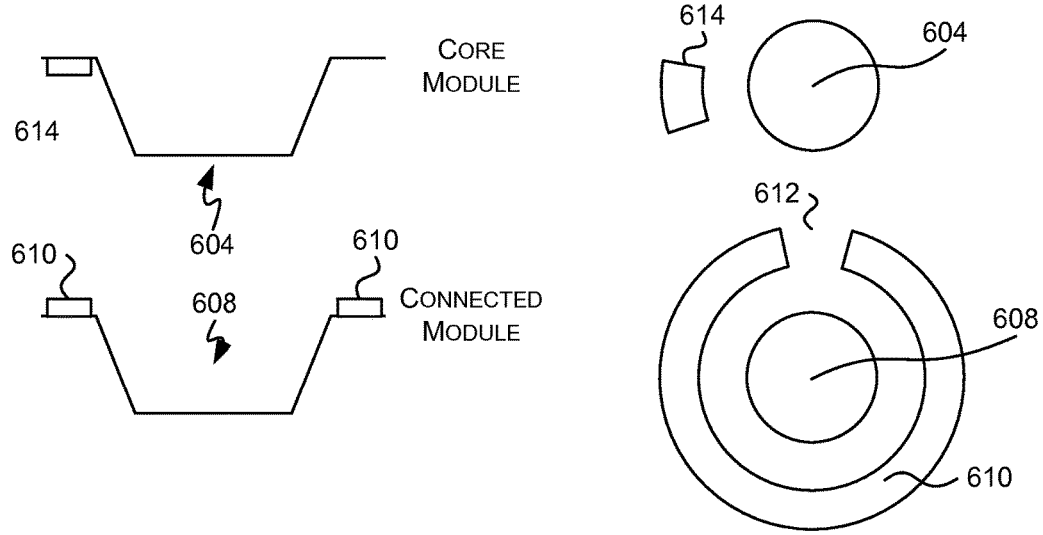

There are many ways in which the angle of attachment may be determined by the core module 102. In one example, the core module may comprise a color sensor 602 (e.g. within the connector or adjacent to the connector 604 as shown in FIG. 6) and the attached module may have a band 606 comprising different colors (e.g. a rainbow-colored band with sections 607 of different colors or grey-scale equivalent) on it (e.g. around the edge of the connector 608), such that the core module can determine orientation of the connected module dependent on the color seen by the color sensor. In an alternative arrangement, also shown in FIG. 6, instead of using a color band, a metal ring 610 with a break 612 in it may be used on the connected module and the core module may comprise an electrical contact 614 which touches a part of the ring 610 and the core module may measure the resistance to ground to determine the position along the ring where the contact is made. Angle of attachment may also be detected by a sensor on the peripheral module, such as a tilt sensor, accelerometer or gyroscope, this reading may be passed to the core module for further processing.

Figure 7:
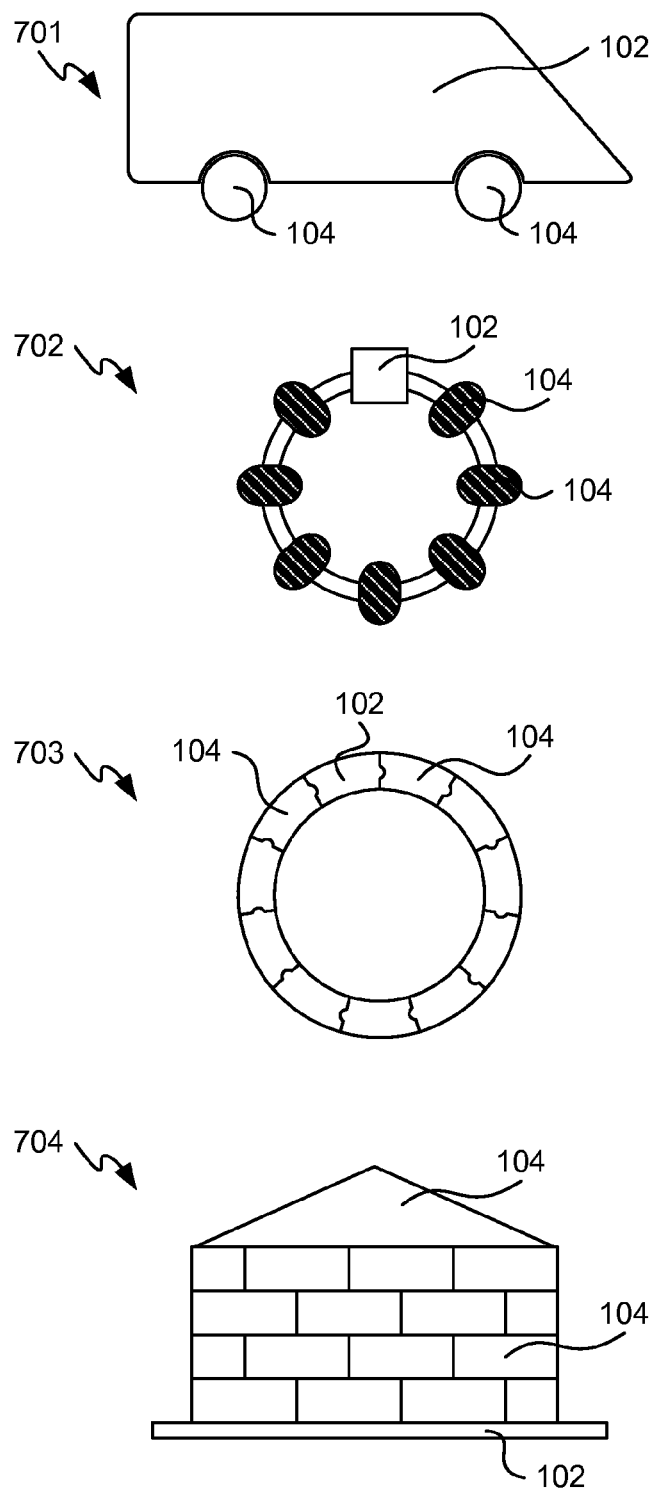
FIG. 7 shows schematic diagrams of various example coherent physical whole objects.

Although FIG. 1 shows an object 100 which is a humanoid/robot character, as described above the modules themselves may have any form factor any may be assembled to form many different types of object. FIG. 7 shows various examples such as a vehicle 701, a bracelet 702, a track assembly 703 and a building 704.

As described above, the core module 102 communicates with a computing device which runs an interactive software experience to provide details of the modules connected together to form a coherent physical whole object and in various examples to provide additional information such as sensor data, data on topology of modules, angle of attachment information, etc. The inputs received from the core module 102 provide inputs to the interactive software experience and affect the way that the experience works. In various examples, the coherent physical whole object 100 is shown within the GUI of the interactive software experience. Interaction of a user with the object 100 may therefore result in changes in the GUI and/or changes in the game play and assembly of particular combinations (or sets) of modules may enable or unlock parts of the interactive software experience. Where a user disconnects and then reconnects the same module (e.g. as detected by the core module and communicated to the interactive software experience) this may result in particular actions/effects within the interactive software experience (e.g. reloading a weapon where the module is a weapon in a game). As also described above, the interactive software experience may in some examples provide commands to the core module (either for execution by the core module or a peripheral module).

Figure 8:
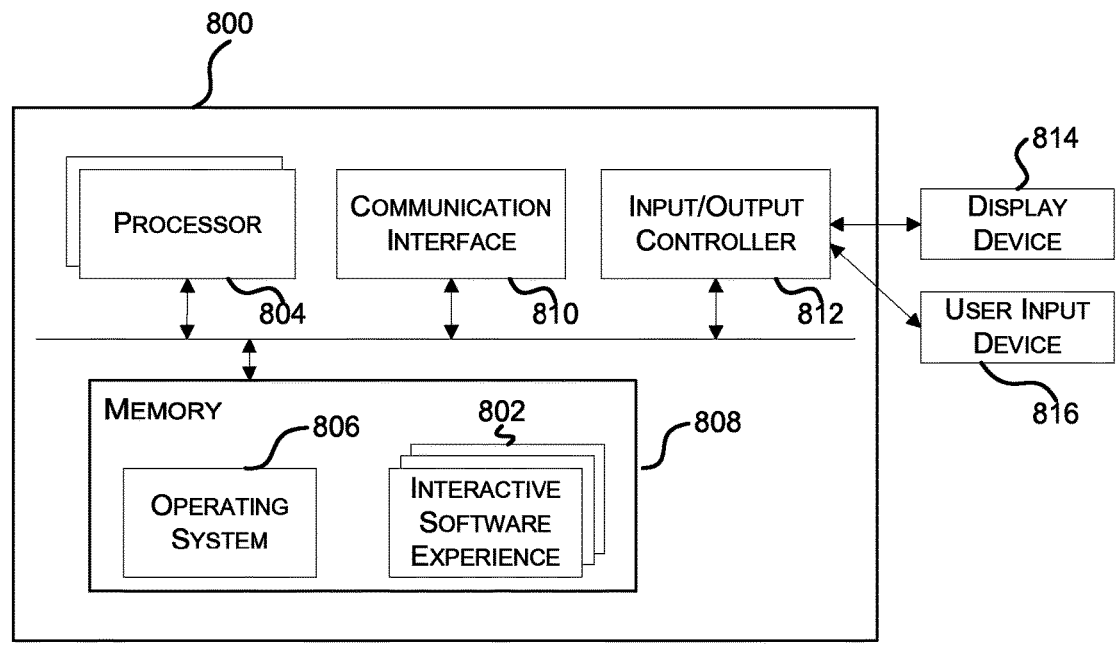
FIG. 8 illustrates various components of an exemplary computing-based device.

FIG. 8 illustrates various components of an exemplary computing-based device 800 which may be implemented as any form of a computing and/or electronic device, and on which the interactive software experience 802 may run. As shown in FIG. 8, the device may run more than one interactive software experience 802 and any object 100 may communicate with one or more interactive software experiences. In some examples, the interactive software experience may be selected by the user and in other examples, the interactive software experience may be determined based on the particular selection of modules assembled into the coherent physical whole 100 by the user.

Computing-based device 800 comprises one or more processors 804 which may be microprocessors, controllers or any other suitable type of processors for processing computer executable instructions to control the operation of the device in order to run the interactive software experience. In some examples, for example where a system on a chip architecture is used, the processors 804 may include one or more fixed function blocks (also referred to as accelerators) which implement a part of the functionality in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 806 or any other suitable platform software may be provided at the computing-based device to enable application software, such as the interactive software experiences 802 to be executed on the device.

The computer executable instructions may be provided using any computer-readable media that is accessible by computing based device 800. Computer-readable media may include, for example, computer storage media such as memory 808 and communications media. Computer storage media, such as memory 808, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 808) is shown within the computing-based device 800 it will be appreciated that the storage may be distributed or located remotely and accessed via a network or other communication link (e.g. using communication interface 810).

The communication interface 810 enables the computing-based device 800 to communicate with core modules 102. Where the computing-based device 800 communicates directly with a core module 102, the communication interface 810 comprises a wireless interface. In other examples, where the computing-based device 800 communicates with a core module via a network or intermediary device, the communication interface may use wired or wireless technology.

The computing-based device 800 also comprises an input/output controller 812 arranged to output display information to a display device 814 which may be separate from or integral to the computing-based device 800. The display information may provide a graphical user interface. The input/output controller 812 is also arranged to receive and process input from one or more devices, such as a user input device 816 (e.g. a mouse, keyboard, camera, microphone or other sensor). In some examples the user input device 816 may detect voice input, user gestures or other user actions and may provide a natural user interface (NUI). This user input may be used to control the interactive software experience 802. In various embodiments the display device 814 may also act as the user input device 816 if it is a touch sensitive display device. The input/output controller 812 may also output data to devices other than the display device, e.g. a locally connected printing device (not shown in FIG. 8).

Any of the input/output controller 812, display device 814 and the user input device 816 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

FIG. 1 shows a coherent physical object 100 which comprises a single core module 102. As described above, in some examples an object may comprise more than one core module 102. In various examples, only one core module 102 within the object may act as the master core module and the other core modules may act as if they are peripheral (or slave core) modules. The operation of the master core module is then as described above (e.g. as shown in FIG. 2). In other examples, however, the object comprising two or more cores may operate differently and in these examples, the object may be referred to as a "super-object" (or "super-toy" for gaming applications).

Figure 9:
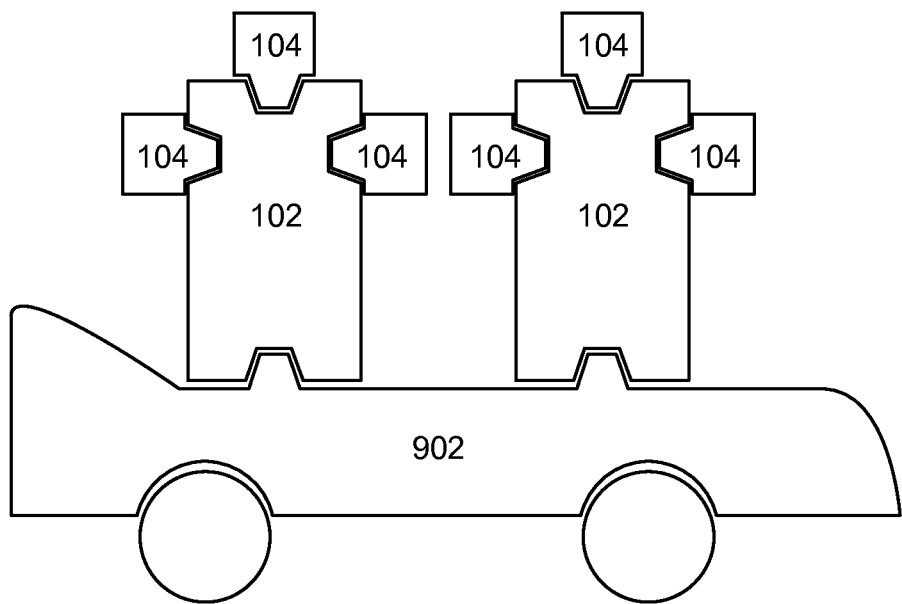
FIG. 9 shows a schematic diagram of a super-object which comprises a plurality of core modules.

FIG. 9 shows a schematic diagram of a super-object 900 which comprises a plurality of core modules 102. In this example, the super-object 900 is formed from a base module 902 which allows multiple core modules 102 to be connected to it and as before, each core module 102 may have one or more peripheral modules 104 connected to it. The module 902 may be considered a common base for both the core modules 102 and in examples where both core modules continue to act as core modules there are different ways in which the core modules may interact such that an interactive software experience has information about the entire structure of the super-object 900.

Figure 10:
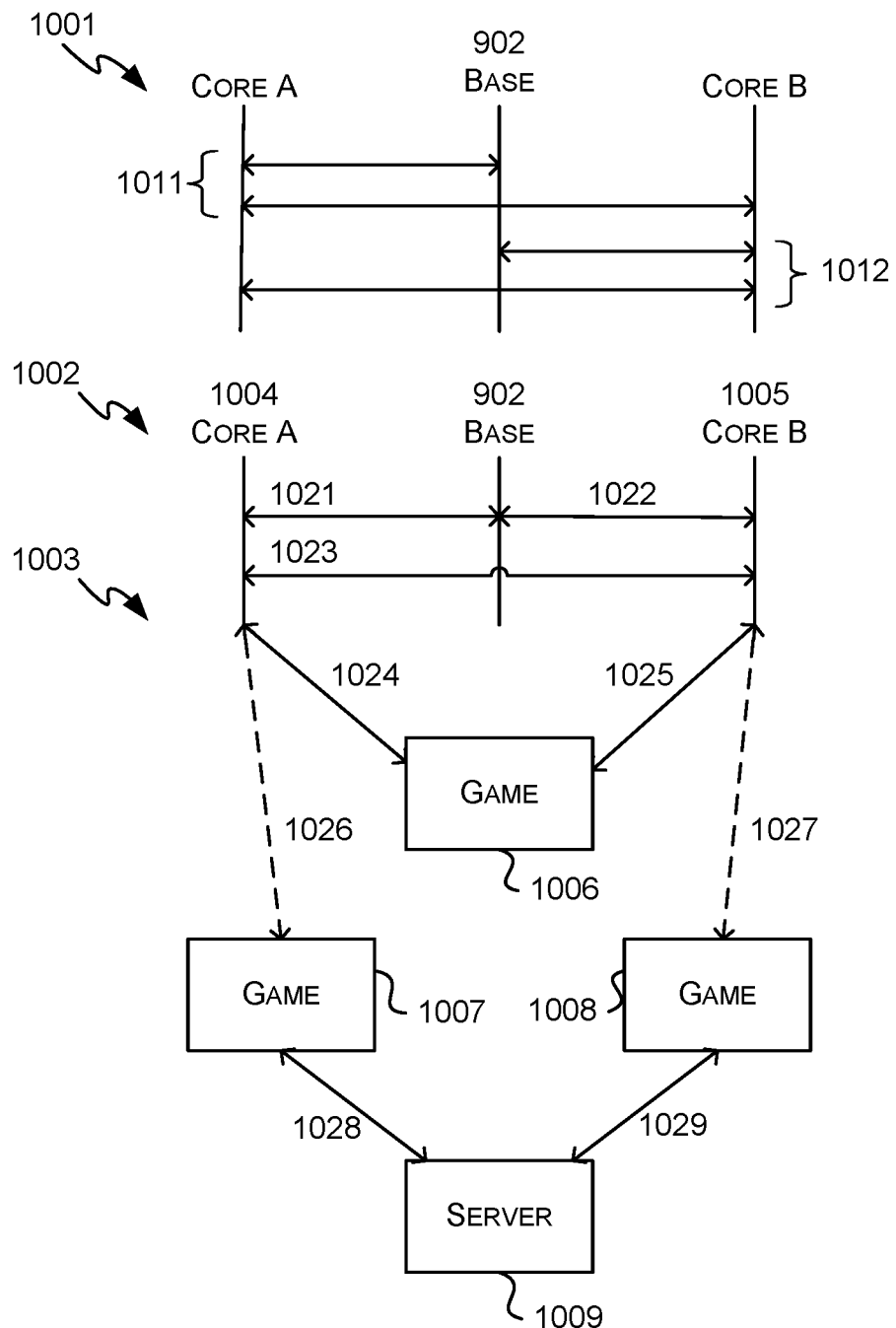
FIG. 10 shows a series of message flows between modules within a super-object, such as shown in FIG. 9.

Each core module 102 in the super-object may identify the peripheral modules connected to it (e.g. three peripheral modules 104 and the base module 902), as described above. Based on the ID of the base module 902, each core module 102 knows that it is a base module and hence that there may be other core modules connected to it. Each core module 102 may discover the other one through electrical connections within the base module 902, through other means (e.g. using RFID) or alternatively this discovery may be performed by the interactive software experience and each of these are depicted in the message flows in FIG. 10 where the two core modules are denoted Core A and Core B.

In the first message flow 1001, cores A and B each detect the ID of the base module 902 and the other core, e.g. using the methods described above. The arrows 1011 denote the ID collection (e.g. as in block 204 of FIG. 2) of core A and the arrows 1012 denote the ID collection of core B. Each core may additionally collect the IDs of each of the peripheral modules 104 connected to the other core, such that each core independently creates a list of IDs (and in some examples topology) for the entire super-object 900 and communicates this with an interactive software experience. In various examples the two cores may communicate with the same interactive software experience or with different interactive software experiences. Alternatively, a core may only detect the presence of the modules connected to itself and the presence of the other core and then may use one of the techniques described below to identify those modules connected to the other core (e.g. as shown in the third message flow 1003).

In the second message flow 1002, cores A and B each detect the ID of the base module 902 (arrows 1021, 1022) and then detect the presence of the other core (arrow 1023) via alternative means, e.g. by using RFID tags embedded in each core and an RFID reader in each core.

Having detected the presence of the other core (but not the peripheral modules connected to that other core) using either of the methods described above (e.g. arrows 1011-1012 or 1021-1023), each core then communicates the topology of its connected modules (peripheral modules 104 and base module 902) to an interactive software experience along with the identity of the other core identified as being also connected to the base module 902, as shown in the third message flow 1003. Where both cores 1004, 1005 communicate with the same interactive software experience 1006, the interactive software experience will receive details of the entire super-object 900 (arrows 1024, 1025); however where each core module communicates with a different interactive software experience 1007, 1008 (dotted arrows 1026, 1027), an interactive software experience will not have information about the modules connected to the other core. In this example, a central server 1009 may be accessed by the interactive software experience to request details about the other core (arrows 1028, 1029). The interactive software experience may also provide details about the core module and connected modules that it has received so that this data can be shared, by the central server, with the other interactive software experience. In this way, both the interactive software experiences 1007, 1008 receive details of all the modules within the super-object 900.

Once an interactive software experience receives details of all the modules within the super-object 900, it may allow two users to control the super-object (within the same interactive software experience) with both users playing the same type of game or alternatively, each of the players may play a different game type (e.g. one being a driving game and controlling a virtual representation of a vehicle part of a super-object and the other being a shooting game and controlling weapons within the super-object). Alternatively, each user may independently interact with the super-object via a different interactive software experience and the user experience may be totally separate or may be linked through communication between the two interactive software experiences.

The principle of a super-object, as described above, provides the ability of create objects in a hierarchical manner. A user can assemble one or more coherent physical whole objects (each of which comprises a core module) and then connect them together to form a super-object. The connection may use a base module 902, such as the one shown in FIG. 9 or alternatively the objects may be connected together in other ways (e.g. by connecting two cores to each other or by connecting a core to a peripheral module which is connected to another core). The particular connection mechanism used may, in part, be dependent upon the connector design because where connectors on the core and peripheral modules are not identical (e.g. where there is one type of connector on the core module and the matching, but different, connectors on peripheral modules, e.g. as shown in FIGS. 1, 4, 6 and 9) a special module may be required to enable connection which comprises more than one of the same type of connector (e.g. as shown in FIG. 9).

Although the present examples are described and illustrated herein as being implemented in a gaming system, the system described is provided as an example and not a limitation. As those skilled in the art will appreciate, the present examples are suitable for application in a variety of different types of interactive software experiences/systems.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A modular assembly system comprising a core module, the core module comprising:
    a battery;
    a wireless communications module arranged to communicate with a computing-based device running an interactive software experience;
    one or more connectors for attaching one or more peripheral modules to the core module, the one or more connectors relying at least partially on magnetic attraction to attach the one or more peripheral modules to the core module via at least one core magnet of the core module, each connector being arranged to pass data and power between the core module and at least one module of the one or more peripheral modules; and
    a processor arranged to:
        collect, directly from the one or more peripheral modules, one or more respective identifiers of the one or more peripheral modules, the core module and the one or more peripheral modules collectively comprising a module set;
        determine module data based at least in part on at least some of the identifiers;
        communicate the module data to the interactive software experience; and
        control a polarity of the core magnet to elect a peripheral module from the core module.

2. The system according to claim 1, wherein the processor is further arranged to detect a topology of the module set.

3. The system according to claim 2, wherein the processor is further arranged to detect the topology by controlling hardware logic in at least some of the one or more modules of the module set to programmatically dissect a data bus between modules in the module set.

4. The system according to claim 1, wherein at least one of the one or more connectors is configured to permit rotation of the core module with respect to an adjacent connected module of the module set.

5. The system according to claim 4, wherein:
    at least one of the one or more connectors comprises an inner contact, a concentric outer contact, and a flexible tab; and
    the inner contact is mounted on the flexible tab to enable it to move separately from the outer contact.

6. The system according to claim 4, wherein at least one of the one or more connectors comprises a sensor for detecting an angle of attachment of the adjacent connected module.

7. The system according to claim 1, further comprising the one or more peripheral modules, at least a first module of the one or more peripheral modules comprising:
    one or more connectors for attaching the first module to a second module of the module set, each connector being arranged to pass data and power between the first module and the second module; and
    a storage element arranged to store an identifier for the first module.

8. The system according to claim 1, further comprising an additional core module, wherein the module set comprises the additional core module.

9. The system according to claim 8, wherein:
    each of the core module and the additional core module further comprises a respective sensor for detecting the presence of another core; and
    each respective sensor comprises at least one of an NFC reader and an image sensor.

10. The system according to claim 1, further comprising the computing-based device running the interactive software experience, the computing-based device comprising:
    a processor;
    a communication interface arranged to communicate with the core module; and
    a memory arranged to store machine-executable instructions of the interactive software experience.

11. The system according to claim 10, wherein the machine-executable instructions are configured to, when the instructions are executed by the processor, cause a change in the interactive software experience in response to receiving the module data identifying a pre-defined set of modules forming the module set.

12. The system according to claim 11, wherein the pre-defined set of modules comprises more than one core module and wherein the change in the interactive software experience comprises enabling two users to interact with the module set.

13. The system according to claim 1, wherein the interactive software experience comprises a game and the module set comprises a toy.

14. A system for use with an interactive software experience, the system comprising a peripheral module, the peripheral module comprising:
one or more connectors for attaching the peripheral module to a core module to form part of an assembly, the assembly comprising one or more modules held together at least partially through magnetic attraction via a core magnet of the core module, a polarity of the core magnet being controllable to elect the peripheral module from the core module, each connector being arranged to pass data and power between modules and the assembly acting as a user input device for the interactive software experience; and
a storage element arranged to store an identifier for the module and to provide the identifier via at least one of the one or more connectors to the core module;
wherein the storage element is configured to not collect an identifier from a neighboring peripheral module of the modular assembly system.

15. The system according to claim 14, wherein the peripheral module further comprises a processor.

16. The system according to claim 14, wherein the peripheral module comprises at least one of an actuator, or a display device, wherein the at least one of an actuator, or a display device are controlled using instructions received from the core module.

17. The system according to claim 14, wherein at least one connector of the one or more connectors further comprises hardware logic configured to break connectivity of an electrical bus between modules in the assembly in response to a command received from the core module.

18. A device comprising:
a battery;
a wireless communications module arranged to communicate with a computing-based device running an interactive software experience;
one or more connectors for attaching peripheral modules to the device, the one or more connectors relying at least partially on magnetic attraction to attach the peripheral modules to the device via at least one programmable electromagnetic actuator of the device, each connector being arranged to pass data and power between modules; and
a processor arranged to:
collect, directly from the peripheral modules physically connected to the device via the one or more connectors, one or more respective identifiers of the peripheral modules;
detect a topology of the peripheral modules;
communicate module and topology data to the interactive software experience; and
in response to a command from the interactive software experience, reverse a polarity of the programmable electromagnetic actuator to elect an attached peripheral module from the device.

* * * * *